United States Patent
Yasuma et al.

(10) Patent No.: US 11,729,289 B2
(45) Date of Patent: Aug. 15, 2023

(54) PUSH MESSAGE COMMUNICATION APPARATUS

(71) Applicant: CANON KABUSHIKI KAISHA, Tokyo (JP)

(72) Inventors: Kensuke Yasuma, Tokyo (JP); Tomoya Sakai, Kawasaki (JP); Kenichi Fujii, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/774,443

(22) Filed: Jan. 28, 2020

(65) Prior Publication Data

US 2020/0162571 A1    May 21, 2020

Related U.S. Application Data

(63) Continuation of application No. 15/196,778, filed on Jun. 29, 2016, now Pat. No. 10,587,712.

(30) Foreign Application Priority Data

Jul. 2, 2015    (JP) ................. 2015-133926

(51) Int. Cl.
  *H04L 67/56*    (2022.01)
  *H04L 69/08*    (2022.01)
  *H04L 67/55*    (2022.01)

(52) U.S. Cl.
  CPC .............. *H04L 67/56* (2022.05); *H04L 67/55* (2022.05); *H04L 69/08* (2013.01)

(58) Field of Classification Search
  CPC .......... H04L 67/26; H04L 67/28; H04L 69/08
  USPC ......................................... 709/206
  See application file for complete search history.

(56) References Cited

U.S. PATENT DOCUMENTS

| | | | |
|---|---|---|---|
| 5,278,984 | A | 1/1994 | Batchelor |
| 6,535,855 | B1 | 3/2003 | Cahill et al. |
| 9,661,000 | B2 | 5/2017 | Yasuma |
| 9,742,897 | B2 | 8/2017 | Sakai |

(Continued)

FOREIGN PATENT DOCUMENTS

| | | |
|---|---|---|
| JP | 2000165419 A | 6/2000 |
| JP | 2003108449 A | 4/2003 |

(Continued)

OTHER PUBLICATIONS

Japanese Office Action dated Jul. 28, 2020, for Corresponding Japanese Application No. 2019160640.

(Continued)

*Primary Examiner* — James E Springer
(74) *Attorney, Agent, or Firm* — Carter, DeLuca & Farrell LLP

(57) ABSTRACT

A communication apparatus for communicating a push message with another communication apparatus, comprises an obtaining unit configured to obtain time information to synchronize a period in which processing related to the push message is possible with the other communication apparatus; and a communication unit configured to execute, during a period of processing in which the processing related to the push message is possible and which is specified based on the time information obtained by the obtaining unit, push message communication with the other communication apparatus.

8 Claims, 9 Drawing Sheets

(56) References Cited

U.S. PATENT DOCUMENTS

| | | | |
|---|---|---|---|
| 10,015,746 B2 | 7/2018 | Sakai et al. | |
| 10,033,886 B2 | 7/2018 | Yasuma | |
| 10,219,314 B2 | 2/2019 | Taniguchi et al. | |
| 2003/0040280 A1 | 2/2003 | Koskelainen | |
| 2003/0045273 A1 | 3/2003 | Pyhalammi et al. | |
| 2006/0242242 A1 | 10/2006 | Ezumi et al. | |
| 2007/0195724 A1 | 8/2007 | Yang et al. | |
| 2008/0004044 A1 | 1/2008 | Simpson et al. | |
| 2008/0016144 A1* | 1/2008 | Hyun | H04L 67/26 709/203 |
| 2009/0157847 A1 | 6/2009 | Shibata | |
| 2010/0138501 A1* | 6/2010 | Clinton | G06F 11/3006 709/206 |
| 2011/0153773 A1* | 6/2011 | Vandwalle | H04L 67/2861 709/217 |
| 2012/0331323 A1 | 12/2012 | Choi et al. | |
| 2013/0111572 A1 | 5/2013 | Gaddam et al. | |
| 2013/0190032 A1 | 7/2013 | Li | |
| 2013/0331080 A1 | 12/2013 | Poon et al. | |
| 2014/0106796 A1 | 4/2014 | Kim | |
| 2014/0153444 A1 | 6/2014 | Zhou et al. | |
| 2015/0081817 A1 | 3/2015 | Jeon et al. | |
| 2015/0245313 A1 | 8/2015 | Lee et al. | |
| 2016/0054778 A1 | 2/2016 | Shin et al. | |
| 2016/0142496 A1* | 5/2016 | Wang | H04L 67/16 709/217 |
| 2016/0323403 A9 | 11/2016 | Kim | |
| 2016/0353513 A1 | 12/2016 | Taniguchi et al. | |
| 2017/0006546 A1 | 1/2017 | Sakai et al. | |
| 2017/0086138 A1 | 3/2017 | Choi et al. | |
| 2017/0156153 A1 | 6/2017 | Hart et al. | |
| 2017/0238251 A1 | 8/2017 | Lu et al. | |
| 2018/0077705 A1 | 3/2018 | Aoki | |

FOREIGN PATENT DOCUMENTS

| | | |
|---|---|---|
| JP | 2011049675 A | 3/2011 |
| JP | 2013502884 A | 1/2013 |
| JP | 2015513332 A | 5/2015 |
| WO | 2011129086 A1 | 10/2011 |

OTHER PUBLICATIONS

Belshe, M., et al., "Hypertext Transfer Protocol Version 2 (HTTP/2)," Internet Engineering Task Force (IETF), May 2015, pp. 1-96, published by the Internet Engineering Steering Group (IESG), ISSN: 2070-1721.

Notification of Reasons for Refusal issued by the Japanese Patent Office dated Mar. 29, 2019 in corresponding Japanese Patent Application No. 2015-133926, with English translation.

Notice of Reasons for Refusal issued by the Japanese Patent Office dated Jun. 7, 2019 in corresponding Japanese Patent Application No. 2015-133926, with English translation.

* cited by examiner

PUSH MESSAGE COMMUNICATION APPARATUS

CROSS REFERENCE TO RELATED APPLICATIONS

This application is a continuation of U.S. patent application Ser. No. 15/196,778, filed on Jun. 29, 2016, which claims the benefit of and priority to Japanese Patent Application No. 2015-133926, filed on Jul. 2, 2015, respectively, the entire contents of each of which are hereby incorporated by reference herein in their entireties.

BACKGROUND OF THE INVENTION

Field of the Invention

The present invention relates to a communication apparatus, a control method thereof, and a storage medium.

Description of the Related Art

In recent years, the development of web techniques has created a need to increase the transfer rate of HTTP/1.1. IETF (Internet Engineering Task Force) has proposed HTTP/2 as the next standard to succeed HTTP/1.1 (RFC7540). HTTP/2 is widely used in communication apparatuses (built-in devices) other than personal computers and browsers.

However, for example, when a communication apparatus is to receive a push message, TCP and HTTP/2 connection need to be maintained with an external apparatus. For example, in a case in which the communication apparatus is a built-in device such as a camera, the standby time may become short since power is consumed to maintain the connection.

The present invention has been made in consideration of the above-described problems, and provides a technique to reduce power consumption of a communication apparatus.

SUMMARY OF THE INVENTION

According to one aspect of the present invention, there is provided a communication apparatus for communicating a push message with another communication apparatus, comprising: an obtaining unit configured to obtain time information to synchronize a period in which processing related to the push message is possible with the other communication apparatus; and a communication unit configured to execute, during a period of processing in which the processing related to the push message is possible and which is specified based on the time information obtained by the obtaining unit, push message communication with the other communication apparatus.

Further features of the present invention will become apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

In an embodiment of the present invention, a communication apparatus hands over a part of the processing to a proxy apparatus to reduce power consumption.

Embodiment

<Arrangement of Communication System>

Figure 1:
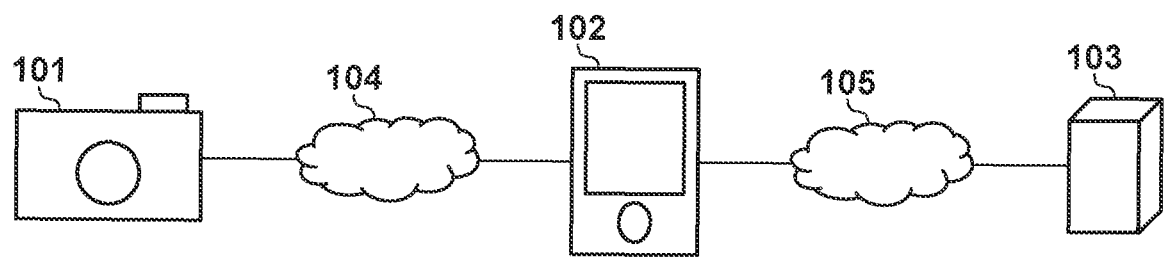
FIG. 1 is a view showing an example of the arrangement of a communication system according to an embodiment of the present invention.

FIG. 1 is a view showing an example of the arrangement of a communication system according to an embodiment of the present invention. A communication apparatus 101 performs reception and transmission of push messages. In this embodiment, the communication apparatus 101 is, for example, a digital camera. A proxy apparatus 102 is also a communication apparatus and acts as a proxy that performs a part of push message transmission/reception processing of the communication apparatus 101. Although the proxy apparatus 102 is implemented as, for example, a smartphone in this embodiment, the present invention is not limited to this. The proxy apparatus 102 can be implemented by a cloud service, a server, a mobile router, a browser, a vehicle, or the like. An external apparatus 103 performs HTTP/2 communication with the communication apparatus 101 and the proxy apparatus 102. The external apparatus 103 performs transmission/reception of push messages with the communication apparatus 101 through the proxy apparatus 102.

The communication apparatus 101 and the proxy apparatus 102 are connected to a network 104. In this embodiment, the network 104 is implemented by using a wireless ad hoc network, but the present invention is not limited to this. The network 104 can be implemented by using the Internet, WAN (Wide Area Network), LAN (Local Area Network), Bluetooth®, Zigbee®, a USB, NFC (Near Field Communication), or any other combination of wired and wireless methods.

The proxy apparatus 102 and the external apparatus 103 are connected to a network 105. In this embodiment, the network 105 is implemented by using the Internet, but the present invention is not limited to this. The network 105 can be implemented by the Internet, WAN (Wide Area Network), LAN (Local Area Network), Bluetooth®, Zigbee®, a USB, or any other combination of wired and wireless methods.

<Arrangement of Communication Apparatus 101>

Figure 2:
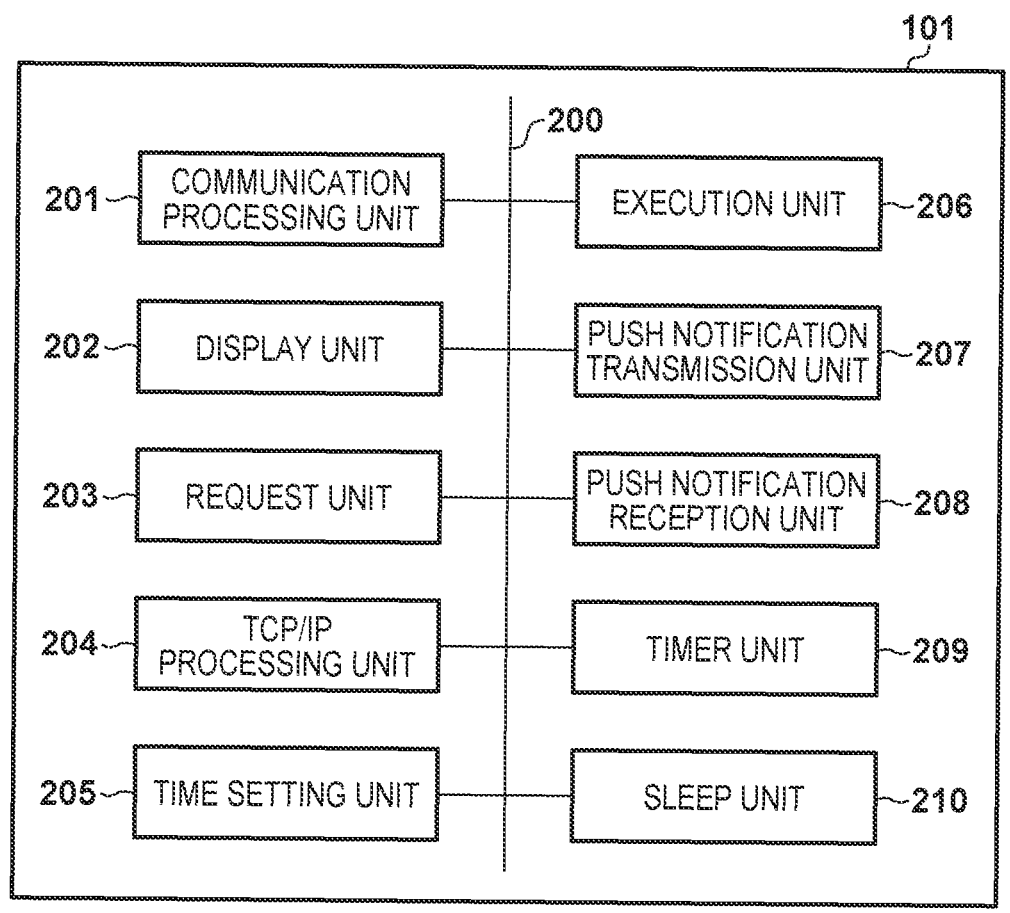
FIG. 2 is a functional block diagram of a communication apparatus according to the embodiment of the present invention.

FIG. 2 is a functional block diagram of the communication apparatus 101 according to the embodiment of the present invention. A bus 200 connects the components. A communication processing unit 201 performs push message transmission/reception processing. Although this embodiment will describe an example which uses UDP, the present invention is not limited to this. Another protocol such as HTTP/2, WebSocket, MQTT (MQ Telemetry Transport), CoAP (Constrained Application Protocol) or the like can be used.

A display unit 202 performs error display and display of the execution result of an application. The display unit 202 operates under the control of a display control unit (not shown). A request unit 203 transmits a push message transmission/reception proxy processing request to the proxy apparatus 102. A TCP/IP processing unit 204 is a unit that controls TCP/IP. Communication with the proxy apparatus 102 or the external apparatus 103 is processed through the TCP/IP processing unit 204. A time setting unit 205 sets the interval to perform push message transmission/reception between the communication apparatus 101 and the proxy apparatus 102. An execution unit 206 executes communication by the communication processing unit 201 at predetermined time intervals set by the time setting unit 205.

A push notification transmission unit 207 transmits a push message to the external apparatus 103 via the proxy apparatus 102. A push notification reception unit 208 receives a push message from the external apparatus 103 via the proxy apparatus 102. A timer unit 209 manages the current time. The timer unit 209 of the embodiment manages the relative time from a given point of time. However, the present invention is not limited to this. The timer unit 209 can manage the absolute time or obtain information from another device by using NTP (Network Time Protocol), GPS, or the like. A sleep unit 210 causes at least some of the functions of the communication apparatus 101 to sleep. Although the sleep unit 210 of the embodiment causes the functions of the communication apparatus to sleep, the present invention is not limited to this. The sleep unit 210 can reduce the clock rate of the CPU or limit operational locations in the communication apparatus 101.

<Arrangement of Proxy Apparatus 102>

Figure 3:
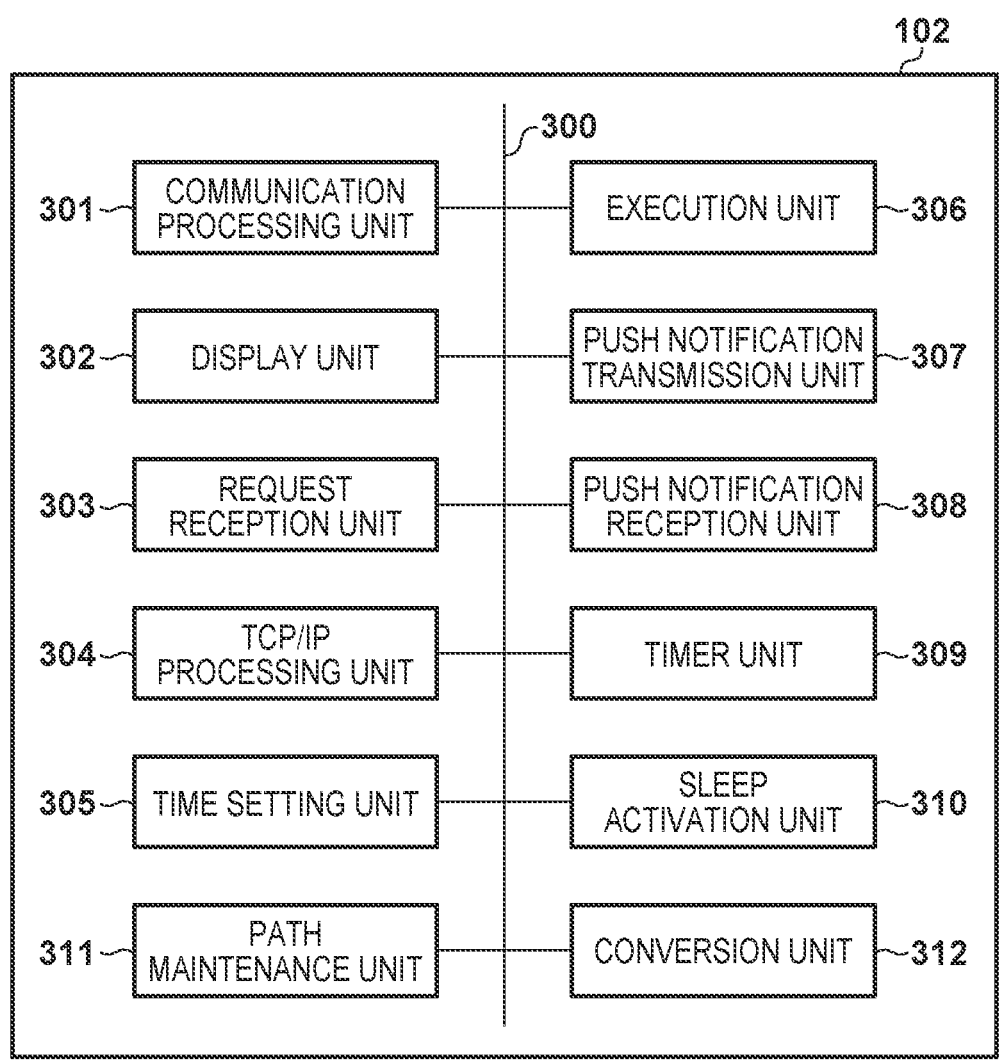
FIG. 3 is a functional block diagram of a proxy apparatus according to the embodiment of the present invention.

FIG. 3 is a functional block diagram of the proxy apparatus 102 according to an embodiment of the present invention. A bus 300 connects the components. A communication processing unit 301 performs push message transmission/reception processing. Although the embodiment will describe an example using UDP, the present invention is not limited to this. Another protocol such as HTTP/2, WebSocket, MQTT (MQ Telemetry Transport), CoAP (Constrained Application Protocol), or the like can be used.

A display unit 302 performs error display and display of the execution result of an application. A request reception unit 303 receives the push message transmission/reception proxy processing request from the communication apparatus 101. A TCP/IP processing unit 304 is a unit that controls TCP/IP. Communication with the communication apparatus 101 or the external apparatus 103 is processed through the TCP/IP processing unit 304. A time setting unit 305 sets the interval to perform push message transmission/reception between the communication apparatus 101 and the proxy apparatus 102. An execution unit 306 executes communication by the communication processing unit 301 at predetermined intervals set by the time setting unit 305.

A push notification transmission unit 307 transmits push messages to the communication apparatus 101 and the external apparatus 103. A push notification reception unit 308 receives push messages from the communication apparatus 101 and the external apparatus 103. A timer unit 309 manages the current time. The timer unit 309 of the embodiment manages the relative time from a given point of time. However, the present invention is not limited to this. The timer unit 309 can manage the absolute time or obtain information from another device by using NTP (Network Time Protocol), GPS, or the like.

A sleep activation unit 310 transmits a message to the communication apparatus 101 to cancel the sleep state. The sleep activation unit 310 of the embodiment cancels the sleep state of the functions of the communication apparatus. However, the present invention is not limited to this. The sleep activation unit 310 can increase the CPU clock rate or transmit a message to cancel the limitation on operational locations in the communication apparatus 101.

A path maintenance unit 311 maintains the communication paths between the communication apparatus 101 and the proxy apparatus 102 and the communication path between the proxy apparatus 102 and the external apparatus 103. The path maintenance unit 311 transmits a packet to maintain each communication path before the path entry of a relay apparatus existing in each of the network 104 and the network 105 is disconnected due to time running out. A "keep-alive" message or a packet included in a push notification or a registration packet of a communication path can be transmitted. Note that although the embodiment will describe an example in which transmission is performed from the proxy apparatus 102, the present invention is not limited to this. The communication apparatus 101 or the external apparatus 103 can perform path maintenance. A conversion unit 312 performs protocol conversion between the protocol to communicate with the communication apparatus 101 and the protocol to communicate with the external apparatus 103. The embodiment will mainly describe an example in which a push message is communicated by UDP between the communication apparatus 101 and the proxy apparatus 102 and a push message is communicated by HTTP/2 between the proxy apparatus 102 and the external apparatus 103. Note that UDP is a protocol which does not need connection maintenance for communication, and HTTP/2 is a protocol in which connection maintenance is necessary. However, the communication protocols to be used are not limited to UDP and HTTP/2.

<Processing of Communication Apparatus 101>

Figure 4:
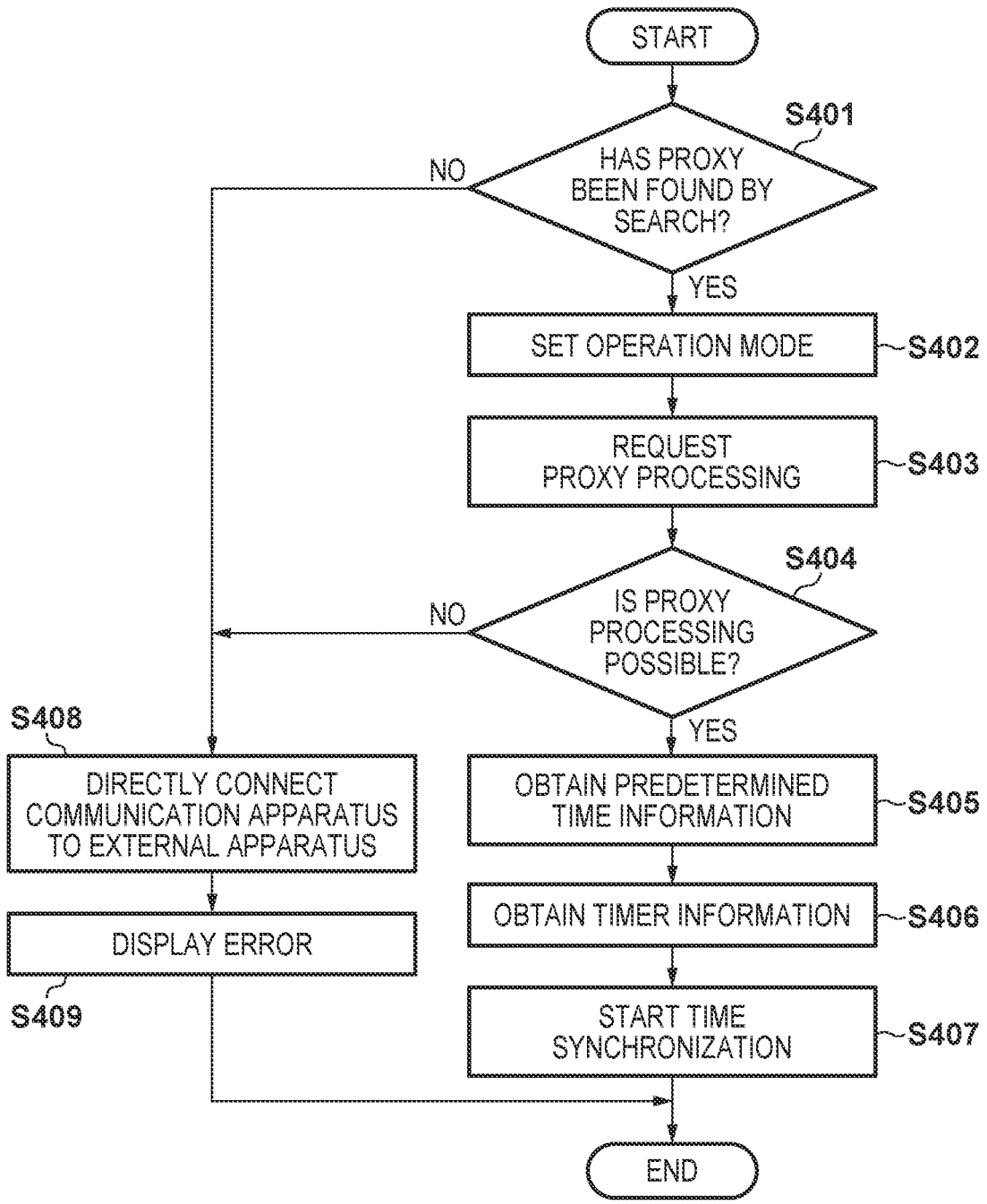
FIG. 4 is a flowchart showing the processing procedure of a case in which the communication apparatus transmits a push message proxy request according to the embodiment of the present invention.

FIG. 4 is a flowchart showing the processing procedure when the communication apparatus 101 according to the embodiment of the present invention transmits a push message proxy request. First, the communication processing unit 201 searches for the proxy apparatus 102 on the network 104 by using SSDP via the TCP/IP processing unit 204 (S401). If the proxy apparatus 102 is found, the process advances to step S402. Otherwise, the process advances to step S408.

Note that although the proxy apparatus search processing was implemented by SSDP in the embodiment, the present invention is not limited to this. It can be implemented by another search protocol such as mDNS, WS-Discovery, or the like. Although the embodiment searched for the proxy apparatus 102, the present invention is not limited to this. The proxy apparatus 102 can be obtained by a preset value, dynamically obtained by using a dynamic DNS or the like, or obtained by using path information such as a default gateway.

The communication processing unit 201 sets the operation mode of a push notification designated by a user, a system, an application, or the like (S402). The operation mode in this case is a mode that indicates whether to transmit, receive, or transmit and receive a push notification. In addition, a plurality of protocols may be used to transmit and receive a push notification or settings and formats may be set in the protocol.

The request unit 203 requests the proxy apparatus 102 to perform proxy processing according to the operation mode set in step S402 (S403). The request unit 203 receives, from the proxy apparatus 102, a message indicating whether it is capable of performing proxy processing. The request unit 203 determines whether proxy processing is possible based on the received message. If proxy processing is determined to be possible, the process advances to step S405. Otherwise, the process advances to step S408.

In this embodiment, the request unit 203 determines that proxy processing is impossible when the request unit 203 receives a message indicating that proxy processing is impossible or when there is no response from the proxy apparatus 102 within a predetermined time.

The time setting unit 205 obtains, for example, predetermined time information from the proxy apparatus 102 to perform transmission/reception of a push message with the proxy apparatus 102 (S405). Note that as the predetermined time, a value set in the communication apparatus 101 can be used or a value of a result obtained from negotiation between the communication apparatus 101 and the proxy apparatus 102 can be used.

The timer unit 209 obtains timer information to perform time synchronization (S406). The time to be used for synchronization can be the absolute time obtained from NTP or a GPS or the relative time which is adjusted at the time of the negotiation with the proxy apparatus 102. Although details of time synchronization will be described later with reference to FIG. 7, time synchronization according to the embodiment is processing to match the processing time of the communication apparatus 101 and the processing time of the proxy apparatus 102. Note that the processing time of the communication apparatus 101 and the processing time of the proxy apparatus 102 need not completely match. The processing times of the respective apparatuses can be set so that a fluctuation occurs in accordance with the type of the network, the communication protocol, and the like.

The communication processing unit 201 starts time synchronization with the proxy apparatus 102 based on the predetermined time information and the timer information obtained by timer information obtainment processing (S407) and ends the processing. The communication processing unit 201 is directly connected to the external apparatus 103 and performs transmission/reception of a push message (S408), but the present invention is not limited to this. Another proxy apparatus may be found and the communication processing unit 201 may be connected to this apparatus. In addition, if the remaining capacity of battery is equal to or less than a predetermined value or when it is at a predetermined setting, the process can advance to step S409 without being connected to the external apparatus 103.

The display unit 202 displays error information to indicate that connection could not be made with the proxy apparatus 102 (S409). The display unit 202 can display a connection mode error when the communication apparatus is directly connected to the external apparatus 103 or connected through another mode. Note that although error notification is performed by display in this embodiment, the present invention is not limited to this. An error can be notified to a user or an application by a method such as flickering of LED, an image, sound, vibration, or a message. The series of processes shown in FIG. 4 thus ends.

<Processing of Proxy Apparatus 102>

Figure 5:
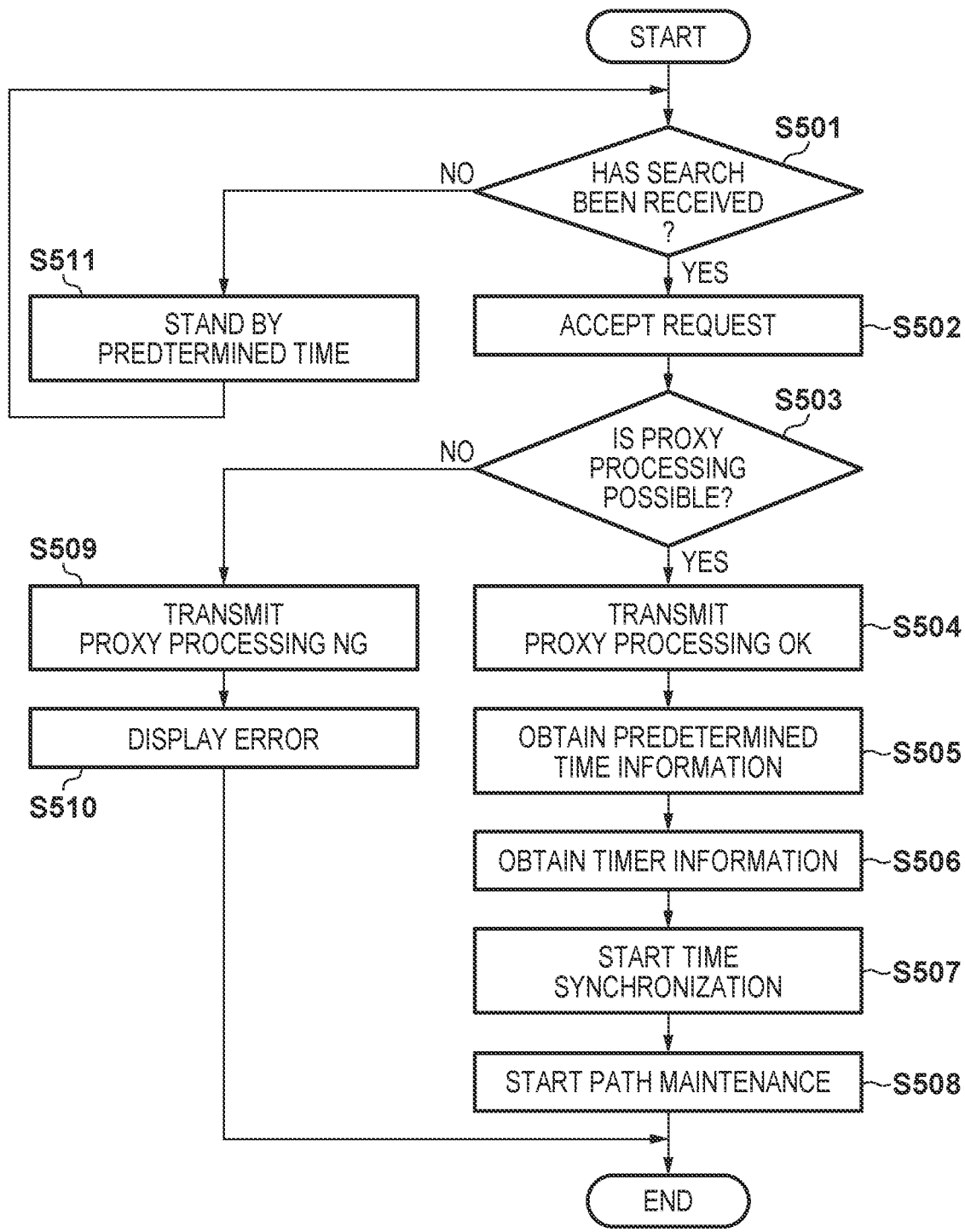
FIG. 5 is a flowchart showing the processing procedure when the proxy apparatus receives a push message proxy request according to the embodiment of the present invention.

FIG. 5 is a flowchart showing the processing procedure when the proxy apparatus 102 according to the embodiment of the present invention receives a push message proxy request. The communication processing unit 301 determines whether a search using SSDP has been received from the communication apparatus 101 on the network 104 via the TCP/IP processing unit 304. If it is determined that a search has been received, the process advances to step S502. Otherwise, the process advances to step S511 and returns to step S501 after standing by for a predetermined time.

Note that although the communication apparatus 101 searches for the proxy apparatus 102 in this embodiment, the present invention is not limited to this. The proxy apparatus 102 can search for the communication apparatus 101 or both apparatuses can search for each other. "Search" in this case can be an operation in which the communication apparatus 101 or the proxy apparatus 102 transmits a search message and finds the message or the transmission of an advertisement. In addition, a wireless LAN, Bluetooth®, or Zigbee® may be used at the time of the search.

The request reception unit 303 receives a proxy processing request message from the communication apparatus 101 (S502). The request reception unit 303 confirms the contents of the request message and determines whether proxy processing according to the operation mode is possible (S503). If proxy processing is determined to be possible, the request reception unit 303 is connected to the external apparatus 103 by HTTP/2 via the communication processing unit 301 and performs push message transmission reception processing in accordance with the operation mode, and the process advances to step S504. Otherwise, the process advances to step S509.

Note that although the communication apparatus 101 transmitted a proxy processing operation request to the proxy apparatus 102 in accordance with the operation mode in this embodiment, the present invention is not limited to this. The proxy apparatus 102 can transmit to the communication apparatus 101 the operation mode information which indicates that proxy processing is possible or a negotiation can be further performed between the communication apparatus 101 and the proxy apparatus 102.

The communication processing unit 301 transmits a message indicating that proxy processing is possible to the communication apparatus 101 (S504). The time setting unit 305 obtains predetermined time information to perform push message transmission/reception with the communication apparatus 101 and transmits the obtained information to the communication apparatus 101 (S505). The predetermined time can be a value set in the proxy apparatus 102, a value obtained from a vender site, or a value of a result of negotiation between the communication apparatus 101 and the proxy apparatus 102.

The timer unit 309 obtains timer information to perform time synchronization (S506). The time used for synchronization can be the absolute time obtained from NTP or a GPS or the relative time adjusted at the time of negotiation with the communication apparatus 101. The communication processing unit 301 starts time synchronization with the communication apparatus 101 (S507). The path maintenance unit 311 starts to maintain the communication paths between the communication apparatus 101 and the external apparatus 103 (S508).

If the network 104 and the network 105 are networks that include routers, respectively, it is known that each router can disconnect a path at a predetermined time. In order to solve this problem, entry registration to maintain the path and transmission/reception of a "keep-alive" packet are performed. Since the interval of entry registration for path maintenance and the interval of a "keep-alive" packet transmission/reception differ depending on the network and the router, the path maintenance unit 311 obtains the intervals for path maintenance in the respective networks 104 and 105. The path maintenance unit 311 can determine the path maintenance interval from, for example, one or both ends of IP addresses. Note that although an example using IP addresses will be described in this embodiment, the present invention is not limited to this. The path maintenance interval can be obtained dynamically. For example, the time during which path maintenance is not possible can be measured by gradually increasing the intervals of path maintenance of a predetermined time.

In addition, although the embodiment will describe an example in which the proxy apparatus 102 performs path maintenance, the present invention is not limited to this. The communication apparatus 101 and the external apparatus 103 can perform path maintenance. Alternatively, the communication apparatus 101 and the proxy apparatus 102 or the proxy apparatus 102 and the external apparatus 103 can cooperate to perform path maintenance. The communication apparatus 101, the proxy apparatus 102, and the external apparatus 103 may request another device such as a router to perform path maintenance processing.

The communication processing unit 301 transmits to the communication apparatus 101 a message indicating that proxy processing is not possible (S509). The display unit 302 displays an error indicating that the proxy processing request could not be accepted (S510). Note that although the embodiment raised an example of displaying the error, the present invention is not limited to this. The user or an application may be notified of the error by another method such as the flickering of an LED, an image, a sound, a vibration, or message.

<Sequence (at Start Time) of Entire Communication System>

Figure 6:
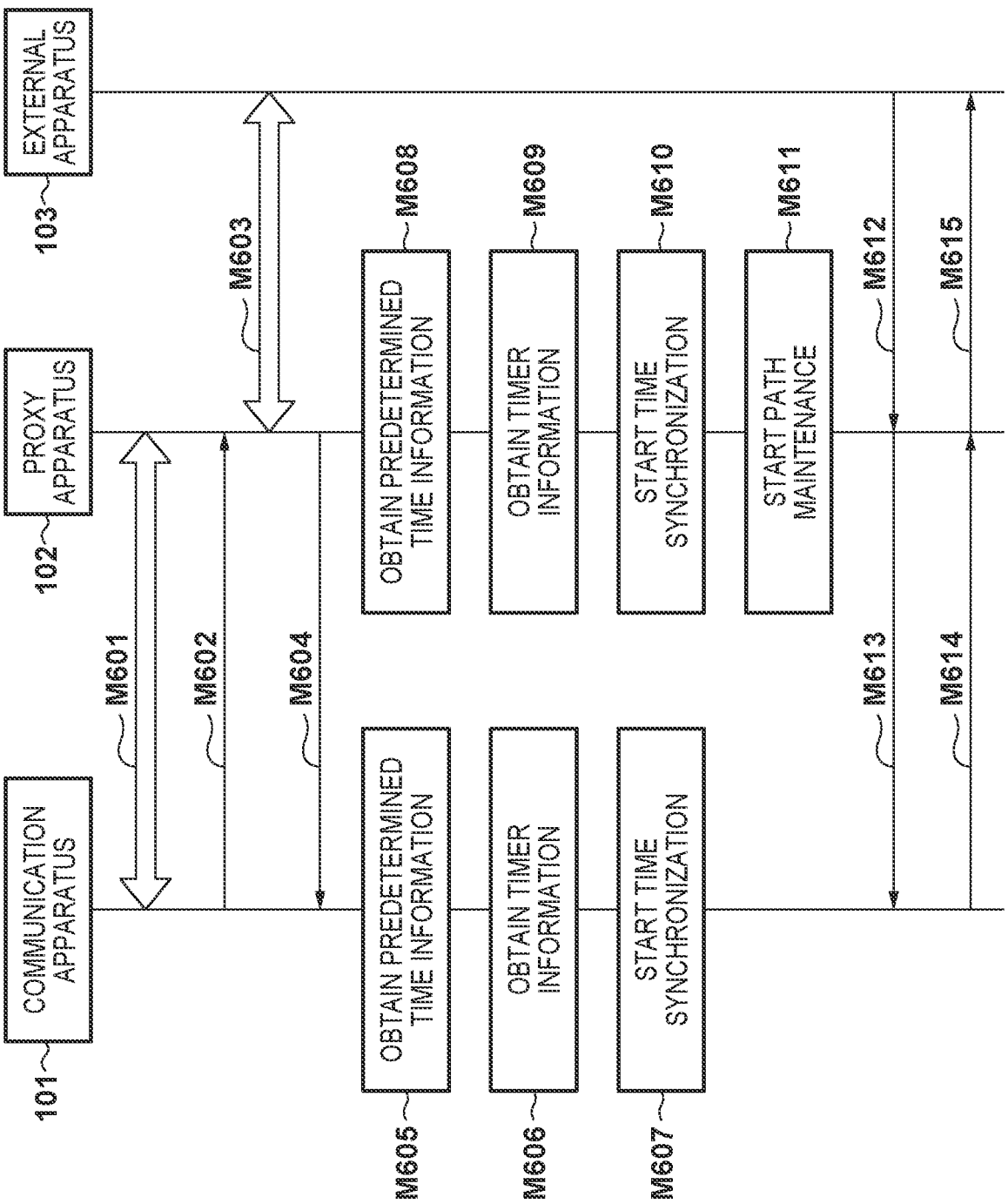
FIG. 6 is a chart showing the sequence at the start of proxy processing of the entire communication system according to the embodiment of the present invention.

FIG. 6 is a chart showing the sequence at the start of proxy processing of the entire communication system according to the embodiment of the present invention. The communication apparatus 101 searches for the proxy apparatus 102 and finds the apparatus (M601). The communication apparatus 101 requests the proxy apparatus 102 to perform proxy processing (M602). Upon receiving the proxy processing request, the proxy apparatus 102 is connected to the external apparatus 103 by HTTP/2 and completes PUSH_PROMISE for push message transmission/reception (M603). If the proxy apparatus 102 is to transmit a push message, the proxy apparatus 102 transmits PUSH_PROMISE to the external apparatus 103. On the other hand, if the proxy apparatus 102 is to receive a push message, the proxy apparatus 102 receives PUSH_PROMISE from the external apparatus 103.

The proxy apparatus 102 transmits, to the communication apparatus 101, a message indicating that proxy processing is possible (M604). The communication apparatus 101 executes processes corresponding to steps S405 to S407 (M605 to M607). The proxy apparatus 102 executes processes corresponding to steps S504 to S508 (M608 to M611). The proxy apparatus 102 receives a push message from the external apparatus 103 by HTTP/2 (M612). After a predetermined time elapses, the proxy apparatus 102 transmits the push message to the communication apparatus 101 by UDP (M613). Then, after a predetermined time elapses, the communication apparatus 101 starts to receive the push message from the proxy apparatus 102 (M613).

After a predetermined time elapses, the communication apparatus 101 transmits a push message to the proxy apparatus 102 by UDP (M614). Then, after a predetermined time elapses, the proxy apparatus 102 starts to receive the push message from the communication apparatus 101 (M614). Subsequently, the proxy apparatus 102 converts the data of the push message received from the communication apparatus 101 and transmits the converted data to the external apparatus 103 by HTTP/2 (M615).

In this embodiment, binary communication using UDP is performed between the communication apparatus 101 and the proxy apparatus 102. JSON format communication using HTTP/2 is performed between the proxy apparatus 102 and the external apparatus 103. In this manner, the proxy apparatus 102 performs protocol format conversion, data format conversion, and network conversion by the conversion unit 312. Although binary communication and JSON format communication are used as the communication formats in the embodiment, the present invention is not limited to this. The formats could be other formats such as XML, text, and the like.

When the communication apparatus 101 and the proxy apparatus 102 are to transmit or receive a push message using UDP in M613 and M614, an ACK message that indicates the delivery of the push message can be further returned. If there is no ACK message, the communication apparatus 101 or the proxy apparatus 102 determines that the UDP packet has been lost in the network and re-transmits the packet. The packet may be re-transmitted within the same period of a communicable state (to be described later) or may be re-transmitted during subsequent and later communicable state periods.

<Processing State (at Normal State) of Communication Apparatus and Proxy Apparatus>

Figure 7:
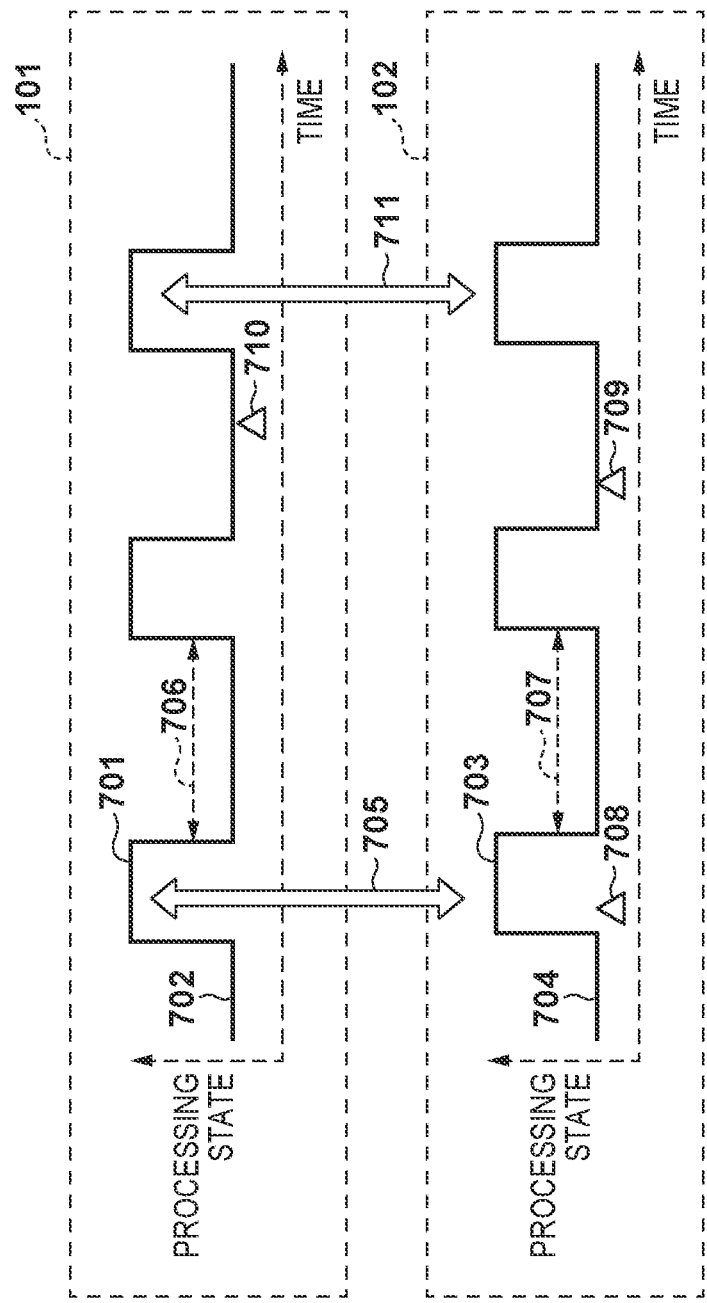
FIG. 7 is a view showing an example of the processing state of the communication apparatus and the proxy apparatus according to the embodiment of the present invention.

FIG. 7 is a view showing an example of the processing states of the communication apparatus 101 and the proxy apparatus 102 according to the embodiment of the present invention. The abscissa indicates the time and the ordinate indicates the processing state.

The processing state of the communication apparatus 101 is in a processable state during a state 701. The state 701 is a push message processable period (non-sleep period). The processing state of the communication apparatus 101 is in a non-processable state during a state 702. The state 702 is a push message non-processable period (sleep period). Time 706 on the side of the communication apparatus 101 is a predetermined time and is synchronized with time 707 which is a predetermined time on the side of the proxy apparatus 102. The predetermined times and the synchronization in this case not only can have a fixed values but can fluctuate or have margins.

In contrast, the processing state of the proxy apparatus 102 is in a processable state during a state 703. The state 703 is a push message processable period. The processing state of the proxy apparatus 102 is in a non-processable state during a state 704. The state 704 is a push message non-processable period. Time 707 on the side of the proxy apparatus 102 is a predetermined time and is synchronized with time 706 which is a predetermined time on the side of the communication apparatus 101. Here, upon receiving a push message from, for example, the external apparatus 103, the proxy apparatus 102 generates a push event 708. Since the push event 708 is generated during the push message processable period, the proxy apparatus 102 transmits a push message 705 to the communication apparatus 101.

As another example, the proxy apparatus 102 generates a push event 709 upon receiving a push message from the external apparatus 103 at a different timing. On the other hand, the communication apparatus 101 generates a push event 710 in response to, for example, the appearance of a suspicious-looking person on camera. Since the push event was generated during the push message non-processable period, the communication apparatus 101 stands by until the state shifts to the push message processable period.

When the process shifts to the push message processable period, the communication apparatus 101 transmits a push message corresponding to the push event 710 to the proxy apparatus 102. On the other hand, the proxy apparatus 102 transmits a push message corresponding to the push event 709 to the communication apparatus 101 (711). Upon receiving the push message corresponding to the push event 710 from the communication apparatus 101, the proxy apparatus 102 converts the received push message into a format matching the external apparatus 103 and transmits a push notification to the external apparatus 103 by HTTP/2.

Here, if hardware used in the proxy apparatus 102 to be connected to the communication apparatus 101 is different from the hardware used to be connected to the external apparatus 103, the hardware submodules to be connected to the communication apparatus 101 can be set to a low clock rate or the sleep state. In this manner, the power consumption of the proxy apparatus 102 can be reduced.

In addition, if time synchronization of push message transmission/reception is being performed between the proxy apparatus 102 and the external apparatus 103, the synchronization can be performed at a cycle associated with the time synchronization between the proxy apparatus 102 and the communication apparatus 101. For example, it could be a single cycle or once out of every two cycles. Since this will allow the processing states of the proxy apparatus 102 and the communication apparatus 101 to be the same, the processing load occurring when shifting between the processable state (corresponding to the push message processable period 703) and the non-processable state (corresponding to the push message non-processable period 704) can be reduced.

In addition, if the communication apparatus 101, the proxy apparatus 102, and the external apparatus 103 use a wireless LAN, the processing load can be reduced further by synchronizing the cycles of the apparatuses with the cycle of the wired LAN. Although a wireless LAN is used in the embodiment, the present invention is not limited to this. Another wireless method such as Bluetooth®, Zigbee®, NFC, or the like may be used in the same manner.

Furthermore, if the communication apparatus 101 receives a push message from the proxy apparatus 102, the communication processing unit 201 of the communication apparatus 101 can analyze the contents of the push message and return the message without transferring the message to the application the display unit 202 is processing. For example, if the communication apparatus receives a PING message, the message can be processed in the communication processing unit 201 without an application. In addition, if the communication processing unit 201 and the display unit 202 are arranged to operate by different CPUs, unnecessary execution of the processing of the display unit 202 can be eliminated, the processing load can be reduced, and the power consumption can be reduced.

In the same manner, if the proxy apparatus 102 receives a push message from the communication apparatus 101, the communication processing unit 301 of the proxy apparatus 102 can analyze the contents of the push message and return the message without transferring the message to the application the display unit 302 is processing. For example, if the proxy apparatus receives a PING message, the message can be processed in the communication processing unit 301 without an application. In addition, if the communication processing unit 301 and the display unit 302 are arranged to operate by different CPUs, unnecessary execution of the processing of the display unit 302 can be eliminated, the processing load can be reduced, and the power consumption can be reduced.

Furthermore, many other apparatuses may request the proxy apparatus 102 to perform push message proxy processing. In this case, if the push message transmission cycle differs for each of the apparatuses, the proxy apparatus 102 may not be able to save power as a result. Therefore, when another new apparatus requests the proxy apparatus 102 to perform push message proxy processing, the proxy apparatus 102 can match the processing state periods by assigning the same cycle as the already time synchronized cycle to the other new apparatus. This allows the processing load to be reduced.

If another push event is further generated during the push message non-processable period that the push event 710 is generated, the communication apparatus 101 can be configured to transmit the generated push events all together to the proxy apparatus 102 during push message transmission 711 after shifting to the push message processable period. Each push event can decrease the size of the push event message by connecting the bodies of the push events after the analysis in the communication apparatus 101.

If the communication apparatus 101 has push events in an amount that cannot be transmitted within the push message processable period, the push messages can be divided and transmitted in accordance with the next push message processable period. At this time, the communication apparatus 101 can transmit first a push message that corresponds to a push event that has a high priority. Also, if the communication apparatus 101 determines that the amount of push events is more than a predetermined value, the communication apparatus can communicate with the proxy apparatus 102 and prolongs the push message processable period. The proxy apparatus 102 can also perform the same processing as that of the communication apparatus 101.

<Processing State (at Emergency State) of Communication Apparatus and Proxy Apparatus>

Figure 8:
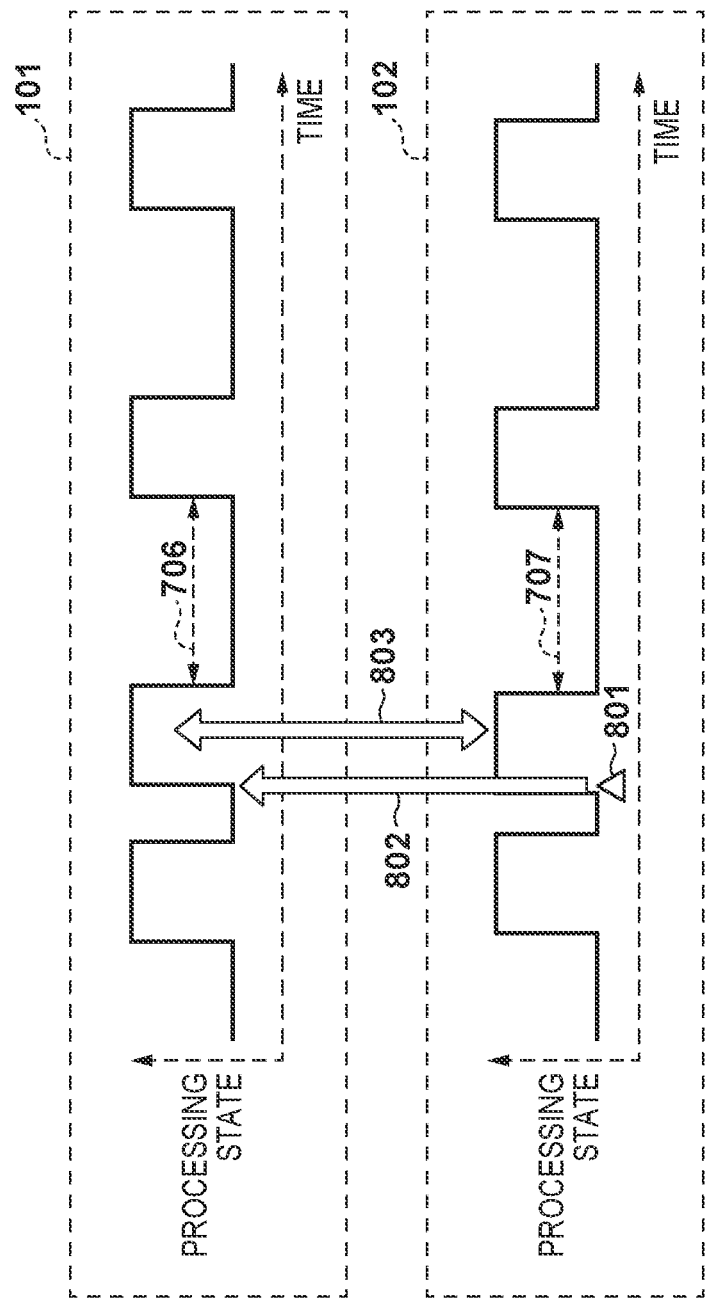
FIG. 8 is a view showing an example of the state of processing when the proxy apparatus transmits an emergency push notification to the communication apparatus according to the embodiment of the present invention.

FIG. 8 is a view showing an example of the processing state when the proxy apparatus 102 transmits an emergency push notification to the communication apparatus 101. Differences from FIG. 7 will be mainly described below. Assume that the proxy apparatus 102 determines that a push event 801 received from the external apparatus 103 is an emergency event. An emergency event is, for example, an event such that when a suspicious-looking person is in the vicinity of the communication apparatus 101 and recording needs to be immediately started. By analyzing the push event received from the external apparatus 103, the proxy apparatus can determine whether the received push event is an emergency event. For example, the determination can be made based on whether information indicating an emergency event has been added. The proxy apparatus 102 uses WOL (WakeOnLan) to externally activate the communication apparatus 101 (802).

Note that the present invention is not limited to this. Sleep cancellation processing can be implemented by transmitting special data even in a case using Bluetooth®, Zigbee®, or NFC. In such a case, a filter dedicated to receive only special data can be provided in the communication processing unit 201 of the communication apparatus 101 as the reception apparatus in order to facilitate further power saving by reducing the frequency of intervention due to the activation of the host CPU. Subsequently, the proxy apparatus 102 transmits, to the communication apparatus 101, a push message corresponding to the push event 801 (803).

Note that the present invention is not limited to this. The communication apparatus 101 can also detect an emergency push event and transmit the emergency push event to the proxy apparatus 102. In this case, if the proxy apparatus 102 is already in a processable state (push message processable period), the WOL processing can be omitted. When there are push events that were generated during the push message non-processable period, the communication apparatus 101 can transmit push messages corresponding to these push events all together at 803. At this time, the communication apparatus 101 can transmit first the push message which corresponds to a high priority push event. The proxy apparatus 102 can perform the same processing as that of the communication apparatus 101.

<Sequence of Entire Communication System when External Apparatus Ends Processing>

Figure 9:
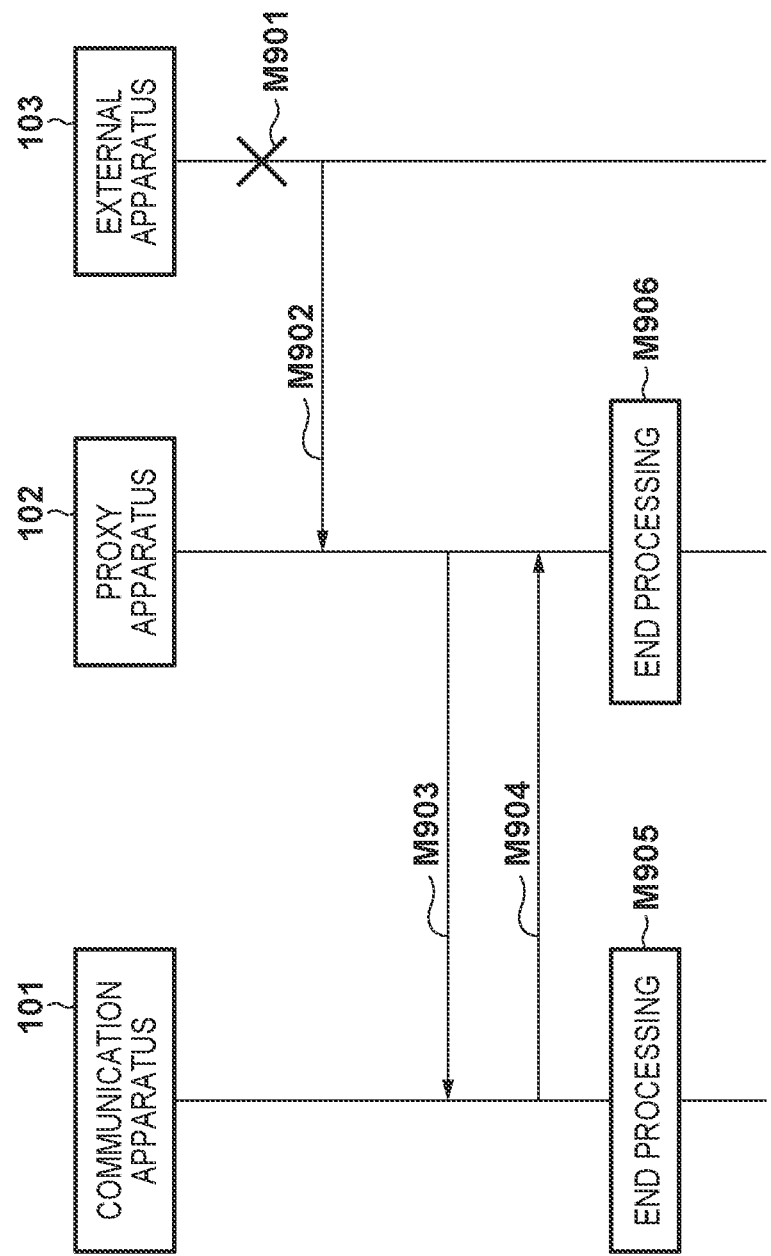
FIG. 9 is a chart showing the sequence of the entire communication system when the external apparatus ends processing according to the embodiment of the present invention.

FIG. 9 is a chart showing the sequence of the entire communication system when the external apparatus 103 ends processing. Assume that the external apparatus 103 ends processing or leaves the network (M901). Then, the proxy apparatus 102 accordingly detects that external apparatus 103 has ended processing or has left the network (M902).

The proxy apparatus 102 transmits, to the communication apparatus 101, a message indicating that the external apparatus 103 has ended the processing or left the network (M903). Upon receiving, from the proxy apparatus 102, the message indicating that the external apparatus 103 has ended the processing or left the network, the communication apparatus 101 transmits an instruction indicating whether to disconnect or to retry the connection with the external apparatus 103 to the proxy apparatus 102 (M904).

In the case of an instruction to disconnect, the communication apparatus 101 and the proxy apparatus 102 end the time synchronization processing (M905, M906). The communication apparatus 101 and the proxy apparatus 102 can transmit or receive a "keep-alive" message (periodically performed communication to confirm that the connection on the network is enabled) during time synchronization. Hence, if the communication apparatus 101 and the proxy apparatus 102 leave the network or end processing, the processing load can be reduced because continuous execution of time synchronization processing can be prevented. The "keep-alive" message can be transmitted at each time synchronization operation or at a frequency of once every couple of operations.

<Sequence (at End Time) of Entire Communication System>

Figure 10:
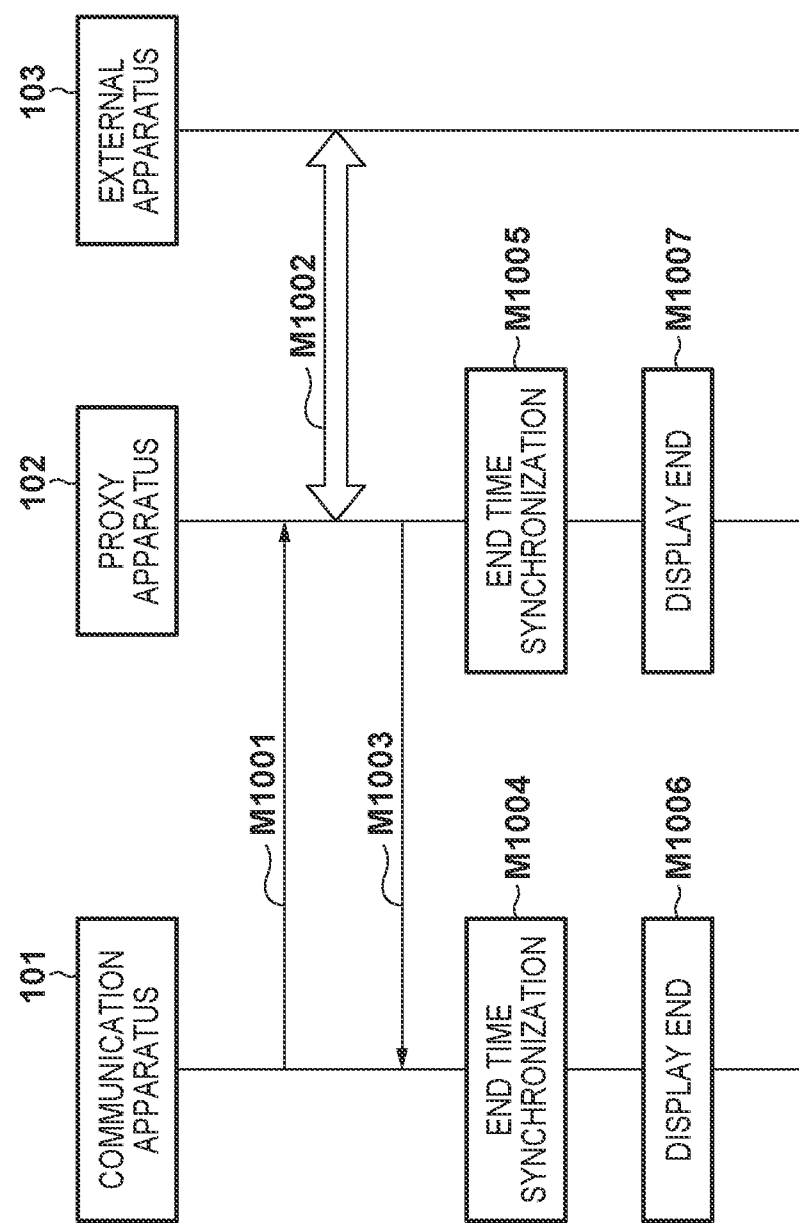
FIG. 10 is a chart showing the sequence at the time of the end of the proxy processing of the entire communication system according to the embodiment of the present invention.

FIG. 10 is a chart showing the sequence at the end of proxy processing of the entire communication system according to the embodiment of the present invention. The communication apparatus 101 requests the proxy apparatus 102 to end proxy processing (M1001). The proxy apparatus 102 ends the HTTP/2 communication used to be connected to the external apparatus 103 and ends push message transmission/reception (M1002). The proxy apparatus 102 transmits, to the communication apparatus 101, a message indicating that connection with the external apparatus 103 has ended (M1003).

Subsequently, the communication apparatus 101 ends time synchronization with the proxy apparatus 102 (M1004). In the same manner, the proxy apparatus 102 ends time synchronization with the communication apparatus 101 (M1005). The communication apparatus 101 displays that the proxy processing by the proxy apparatus 102 has ended and that the push message transmission/reception processing with the external apparatus 103 has ended (M1006). In the same manner, the proxy apparatus 102 displays that the proxy processing which it was performing at the request of the communication apparatus 101 has ended and that the push message transmission/reception processing with the external apparatus 103 has ended (M1007).

In this manner, the communication apparatus 101 can end the push message transmission/reception via the proxy apparatus 102. After the series of processes end, the communication apparatus 101 can directly be connected to the external apparatus 103. In addition, even if the communication link between the communication apparatus 101 and the proxy apparatus 102 is disconnected, the communication apparatus 101 can control the communication processing unit 201 so as to be directly connected to the external apparatus 103 to make push message transmission/reception continuously executable.

Additionally, the process of M1001 can be skipped, and the proxy apparatus 102 can take a leading role to notify the communication apparatus 101 of the end of push message transmission/reception. Note that although time synchronization is performed between the communication apparatus 101 and the proxy apparatus 102 in the embodiment, the processing state can always be set to a processable state or the time of the processable state can prolong in cases in which a predetermined condition is satisfied. For example, as case in which a predetermined condition is satisfied, when the user operates on either the communication apparatus 101 or the proxy apparatus 102, the processing state can always be set to a processable state or the time of the processable state can prolong. Usability improves if a push message can be transmitted/received at an earlier time. Furthermore, a case that satisfies the predetermined conditions is when there is a large remaining capacity of battery in each of the communication apparatus 101 and the proxy apparatus 102 or when power is supplied to each apparatus. Alternatively, the cases could be, for example, when the communication apparatus 101 finds a suspicious-looking person or when the communication apparatus 101 receives an event about monitoring a suspicious-looking person from the proxy apparatus 102 or another communication apparatus.

Although an example using only one external apparatus 103 is described for the sake of descriptive convenience, the present invention is not limited to this. The communication apparatus 101 can perform proxy processing request to be connected to a plurality of external apparatuses. If the communication apparatus 101 is connected to a plurality of external apparatuses 103, the proxy apparatus 102 copies a message to an external apparatus 103 and transmits the copied message to at least one appropriate external apparatus 103. This allows the communication apparatus 101 to transmit push messages to the plurality of external apparatuses by a single push message, and the processing load of the communication apparatus 101 can be reduced.

Although only one proxy apparatus 102 is described in the example, the present invention is not limited to this. The communication apparatus 101 may be connected to a plurality of proxy apparatuses. The embodiment of the present invention has been thus shown.

According to the embodiment, the communication apparatus can reduce the processing load for connection maintenance and reduce the power consumption. In the case of a built-in device such as a camera, the push message standby time effectively prolongs.

According to the present invention, the power consumption of the communication apparatus can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A communication apparatus comprising:
one or more hardware processors; and
one or more memories which store instructions executable by the one or more hardware processors to cause the communication apparatus to perform at least:
setting an operation mode for communicating with an external apparatus;
transmitting a request to a proxy apparatus for requesting a proxy processing according to the operation mode, the proxy processing being for receiving a message from the external apparatus on behalf of the communication apparatus;
receiving, from the proxy apparatus, a response to the request, wherein the response is based on whether the proxy apparatus is capable of proxy processing according to the operation mode;
after receiving the response, communicating with the proxy apparatus a period during which the communication apparatus is able to communicate with the proxy apparatus to receive the message which the proxy apparatus receives from the external apparatus, in a case where the received response indicates that the proxy apparatus is available to execute the proxy processing; and
receiving the message from the proxy apparatus during the period.

2. The communication apparatus according to claim 1, wherein the communication apparatus notifies an error by displaying error information on a display unit of the communication apparatus, in a case where the received response indicates that the proxy apparatus is not available to execute the proxy processing.

3. The communication apparatus according to claim 1, wherein the communication apparatus executes a negotiation to determine the period.

4. The communication apparatus according to claim 1, wherein the message to or from the external apparatus is a push message.

5. The communication apparatus according to claim 1, wherein the communication apparatus is unable to communicate with the proxy apparatus outside the period.

6. The communication apparatus according to claim 1, wherein the communication apparatus performs time synchronization with the proxy apparatus based on the period.

7. A control method of a communication apparatus, the control method comprising:
setting an operation mode for communicating with an external apparatus;
transmitting a request to a proxy apparatus for requesting a proxy processing, the proxy processing being for receiving a message from the external apparatus on behalf of the communication apparatus;
receiving, from the proxy apparatus, a response to the request, wherein the response is based on whether the proxy apparatus is capable of proxy processing according to the operation mode;
after receiving the response, communicating with the proxy apparatus a period during which the communication apparatus is able to communicate with the proxy apparatus to receive the message which the proxy apparatus receives from the external apparatus, in a case where the received response indicates that the proxy apparatus is available to execute the proxy processing; and
receiving the message from the proxy apparatus during the period.

8. A non-transitory computer readable storage medium storing a computer program for causing a computer to execute a control method of a communication apparatus, the control method comprising:
setting an operation mode for communicating with an external apparatus;
transmitting a request to a proxy apparatus for requesting a proxy processing, the proxy processing being for receiving a message from the external apparatus on behalf of the communication apparatus;

receiving, from the proxy apparatus, a response to the request, wherein the response is based on whether the proxy apparatus is capable of proxy processing according to the operation mode;

after receiving the response, communicating with the proxy apparatus a period during which the communication apparatus is able to communicate with the proxy apparatus to receive the message which the proxy apparatus receives from the external apparatus, in a case where the received response indicates that the proxy apparatus is available to execute the proxy processing; and receiving the message from the proxy apparatus during the period.

* * * * *